3,200,064
REFINING OF GAS OIL WITH HYDROGEN FLUORIDE ENRICHED SLUDGE
Harley F. Hardman, Lyndhurst, Ohio, assignor to The Standard Oil Company, Cleveland, Ohio, a corporation of Ohio
Filed Aug. 3, 1962, Ser. No. 214,549
1 Claim. (Cl. 208—280)

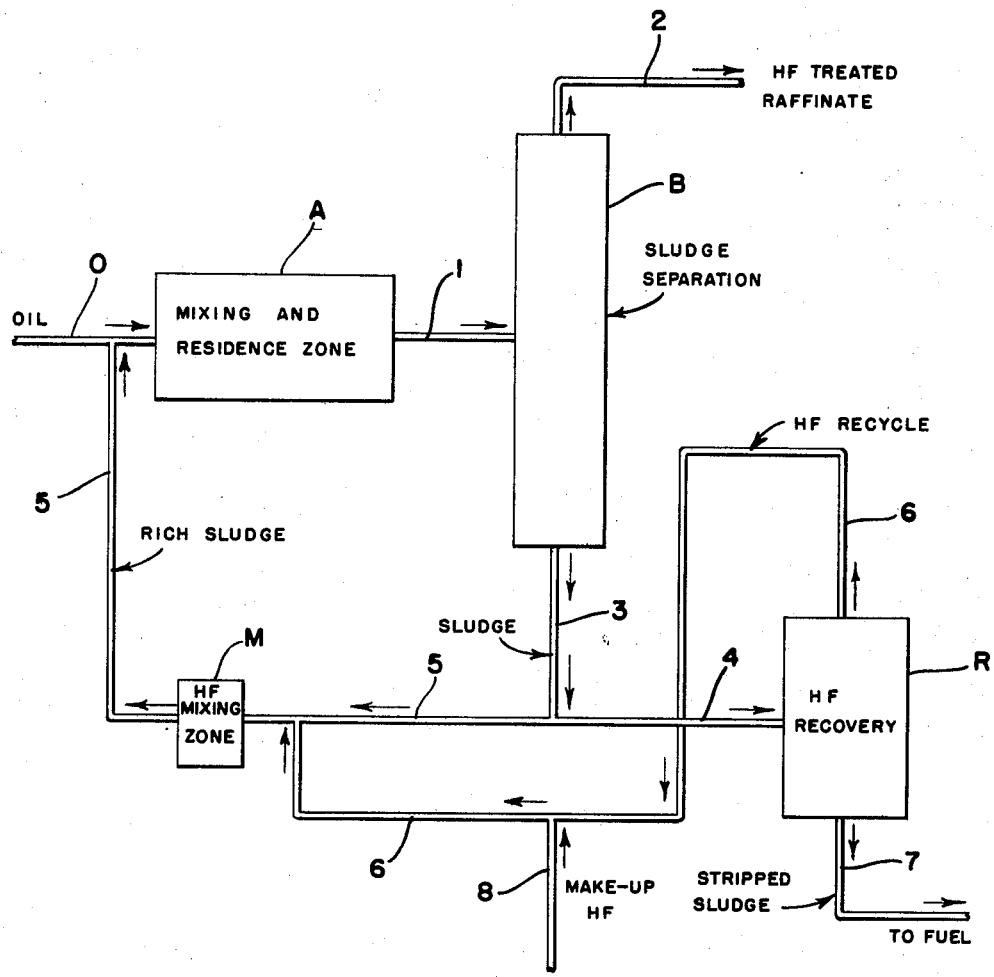

This invention is related to the treatment of a gas oil to improve it as a catalytic cracking stock. More particularly, the gas oil is contacted with a sludge rich in hydrogen fluoride (HF) that removes undesirable factors from the oil.

It has been known that gas oil can be treated with liquid hydrozen fluoride to obtain a more desirable petroleum product. This invention relies on the novel idea of a hydrogen fluoride-rich sludge treatment of gas oil to enhance its properties.

An object of this invention is to provide a process in which the after-treatment of the gas oil requires a minimum amount of clean-up to remove the hydrogen fluoride carry-over.

Another object of this invention is to provide a process in which the separation of sludge from the raffinate and subsequent treatment are simple.

An additional object of this invention is to use a hydrogen fluoride-rich sludge to treat a gas oil to be used as catalytic stock to achieve a minimum amount of coke formation, maximum conversion and gasoline production.

The treatment of gas oil with a sludge that is rich in hydrogen fluoride is an economical and simple method for removing basic nitrogen, heavy metals and polycyclic aromatics from the oil prior to catalytic cracking. The basic nitrogen is undesirable because it inhibits cracking and increases coke yield. Heavy metals reduce catalyst selectivity and increase gas and coke yields. Polycyclic aromatics are undesirable because they produce high coke yield.

In this novel process a sludge having from 7 to 14% hydrogen fluoride from former treatments is enriched with hydrogen fluoride and re-used to treat a gas oil. This enriched sludge contains 10 to 20% hydrogen fluoride and at least 1% more hydrogen fluoride than the unenriched sludge. The enriched sludge and the gas oil are brought together and mixed to achieve hydrogen fluoride transfer to the gas oil. Some time in the residence zone is allowed for this to occur. The resulting mixture of treated oil and sludge proceeds to a separator where the raffinate and sludge are separated by conventional methods, such as settling, centrifuging, electrostatic precipitation or any other suitable means. The raffinate containing a small amount of hydrogen fluoride is carried away to a clean-up unit to reduce this hydrogen fluoride content further, a step which is conventional and not a part of the invention. The post treatment sludge contains about 7 to 14% hydrogen fluoride. A portion of this sludge is conducted to the hydrogen fluoride recovery tower where it is heated to a temperature of 250 to 500° F. The heat splits the hydrogen fluoride from the sludge and this hydrogen fluoride is recovered. The recovered hydrogen fluoride is available for recycle to enrich the post treatment sludge, and the stripped sludge is removed from the hydrogen fluoride recovery tower and is available as fuel. The remaining portion of the post treatment sludge is enriched with the recovered hydrogen fluoride and, if necessary, additional hydrogen fluoride make-up, and is re-used in the process.

The gas oil is any oil suitable for catalytic cracking. Normally it is in the boiling range of 480° F. to 1000° F. It may be desirable to treat only the gas oils boiling above 800° F. with hydrogen fluoride sludge since basic nitrogen metals are more concentrated in these fractions. The oils may either be virgin gas oil, coker gas oil, or catalytic gas oil, or mixtures of these three.

Apparatus suitable for practicing the invention is shown in the figure. It consists of a gas oil line O and the hydrogen fluoride enriched sludge line 5. The gas oil contacts the hydrogen fluoride-rich sludge and passes to the mixing and residence zone vessel A where mixing occurs. The material resides here for a sufficient time to permit the hydrogen fluoride transfer. The sludge-treated gas oil then passes through line 1 to the sludge separator B where it separates into the hydrogen fluoride raffinate and post treatment sludge. The raffinate is removed from the top of the separator in line 2 and contains a small amount of hydrogen fluoride; it may be further treated to reduce its hydrogen fluoride content. The post treatment sludge exits through the line 3, and a portion of it is carried to the hydrogen fluoride recovery tower R through line 4 and the remaining portion passes through line 5 and is available to be enriched. The sludge that goes to the hydrogen fluoride recovery tower is heated and the hydrogen fluoride splits off and is recycled through line 6 to enrich the post treatment sludge and to increase the hydrogen fluoride content. The enriched sludge may be re-used in the process. The stripped sludge is carried off through line 7 to be used as fuel. Make-up hydrogen fluoride can be added through line 8.

The preferred embodiment of the invention follows. It is not intended, however, that it limit the invention in any way.

*Example 1*

A gas oil enters the oil line O at a rate of 1250 barrels per hour. The oil has a B.P. range of 423° to 900° F. and contains the following impurities in parts per million.

|  | p.p.m. |
|---|---|
| Basic nitrogen | 620 |
| Iron | 10 |
| Nickel | 9 |
| Vanadium | 8 |

The oil temperature is 120° F. The enriched sludge flows through line 5 at a rate of 250,000 pounds per hour. The enriched sludge contains 14.4% fluorine. The enriched sludge and the oil are brought into contact and pass to the mixing and residence zone A. The residence time is 20 minutes. The hydrogen fluoride sludge-treated oil then passes through line 1 to the sludge separator B. The temperature in the sludge separator is 120° F. Here the sludge and raffinate are separated. The sludge in the amount of 267,600 pounds per hour passes from the bottom of the separator through line 3. This sludge contains 13.3% fluorine. A 20,650-pounds per hour portion of this sludge is directed to the hydrogen fluoride recovery tower R where the temperature is maintained at 400° F. The remaining 246,950 pounds per hour portion of this sludge passes to a mixing zone M. The hydrogen fluoride at a rate of 2635 pounds per hour is split from the sludge at the hydrogen fluoride recovery tower R and additional hydrogen fluoride make-up in the amount of 415 pounds per hour is added through line 8, and the total hydrogen fluoride of 3050 pounds per hour is added to the 246,950 pound portion of sludge to enrich it in the mixing zone M. The stripped sludge is recovered at the rate of 18,015 pounds per hour and is available to be burned as fuel. The amount of fluorine in the stripped sludge is 0.04%.

The hydrogen fluoride raffinate is conducted through line 2 at the rate of 1210 barrels per hour. It has a temperature of 120° F. The raffinate analysis is:

| | p.p.m. |
|---|---|
| Basic nitrogen | 17 |
| Iron | <1 |
| Nickel | <1 |
| Vanadium | <1 |
| Fluorine | 1100 |

The cracking of the treated gas oil was done in a fixed bed at a temperature of 940° F. and a pressure of one atmosphere. The catalyst was Filtrol SR. The liquid hourly space velocity was 1.40, and the operation was conducted for one hour.

A comparison of product yields from untreated gas oil and the defluorinated raffinate follows:

| | Untreated | Defluorinated Raffinate |
|---|---|---|
| $C_1$-$C_3$, wt. percent | 8.4 | 8.6 |
| $C_4$, vol. percent | 5.8 | 6.3 |
| $C_5$-400, vol. percent | 29.0 | 39.5 |
| $C_4^+$, vol. percent | 34.8 | 45.8 |
| Coke, wt. percent | 5.6 | 3.8 |
| Total Conversion, wt. percent | 42.9 | 51.7 |

I claim:

A continuous process for improving the quality of gas oil as catalytic stock which comprises the steps of
(1) treating a gas oil with a sludge which has been enriched with hydrogen fluoride to provide a hydrogen fluoride content within the range of 10–20 wt. percent, said sludge having been generated by treating a gas oil with hydrogen fluoride,
(2) allowing sufficient time for hydrogen fluoride transfer to the gas oil with a concomitant reduction of hydrogen fluoride in the sludge, to a level within the range of 7–14 wt. percent and at least 1 wt. percent less than the enriched sludge,
(3) separating the raffinate containing hydrogen fluoride from the sludge.
(4) heating a portion of the sludge to recover hydrogen fluoride and a stripped sludge,
(5) enriching another portion of the sludge separated in step 3 with the recovered hydrogen fluoride of step 4 and recycling the enriched sludge to step 1.

References Cited by the Examiner

UNITED STATES PATENTS

| | | | |
|---|---|---|---|
| 2,375,675 | 5/45 | Matuszak | 208—256 X |
| 2,388,087 | 10/45 | Ryan et al. | 208—256 |
| 2,590,490 | 3/52 | Benedict | 208—280 |
| 3,043,771 | 7/62 | Bloch | 208—13 |
| 3,061,539 | 10/62 | Moritz et al. | 208—252 X |

OTHER REFERENCES

Ind. Eng. Chem., vol. 38, pp. 147–155, 1946. Table VI, p. 155.

ALPHONSO D. SULLIVAN, Primary Examiner.